United States Patent
Aleshin et al.

(10) Patent No.: US 11,817,226 B2
(45) Date of Patent: Nov. 14, 2023

(54) BOTTOM NOZZLE WITH PROTECTIVE INSERT

(71) Applicant: Westinghouse Electric Company LLC, Cranberry Township, PA (US)

(72) Inventors: Yuriy Aleshin, Cayce, SC (US); Thanh H. Do, Columbia, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 0 days.

(21) Appl. No.: 17/454,364

(22) Filed: Nov. 10, 2021

(65) Prior Publication Data

US 2023/0141492 A1 May 11, 2023

(51) Int. Cl.
G21C 3/33 (2006.01)
G21C 17/10 (2006.01)

(52) U.S. Cl.
CPC .......... *G21C 3/3305* (2013.01); *G21C 17/10* (2013.01)

(58) Field of Classification Search
CPC ...... G21C 3/33; G21C 3/3305; G21C 17/102; G21C 17/108; G21C 13/032; G21C 13/036; G21C 17/116
USPC .......... 376/245, 254, 446, 449, 450
See application file for complete search history.

(56) References Cited

U.S. PATENT DOCUMENTS

| | | | | |
|---|---|---|---|---|
| 3,856,517 A | * | 12/1974 | Bates | C22C 38/001 420/49 |
| 4,038,133 A | * | 7/1977 | Bittermann | G21C 5/06 976/DIG. 102 |
| 4,381,284 A | * | 4/1983 | Gjertsen | G21C 3/3315 976/DIG. 102 |
| 4,778,647 A | * | 10/1988 | Gasparro | G21C 17/108 376/292 |
| 4,990,304 A | * | 2/1991 | Rylatt | G21C 17/108 376/439 |
| 5,283,812 A | * | 2/1994 | Verdier | G21C 3/3206 376/310 |
| 2007/0189433 A1 | * | 8/2007 | Chambrin | G21C 3/3315 376/262 |
| 2013/0058449 A1 | * | 3/2013 | Johansson | G21C 7/10 376/434 |
| 2018/0268949 A1 | | 9/2018 | Aleshin et al. | |
| 2020/0373025 A1 | | 11/2020 | Aleshin et al. | |

FOREIGN PATENT DOCUMENTS

DE 10135677 A1 * 9/2002 ............... G21C 3/04

* cited by examiner

*Primary Examiner* — Jack W Keith
*Assistant Examiner* — Jinney Kil
(74) *Attorney, Agent, or Firm* — K&L Gates LLP

(57) ABSTRACT

An insertable flux thimble interface for use in a bottom nozzle of a fuel assembly in a nuclear reactor (i.e., a bottom nozzle insert) is disclosed herein. In various aspects, the bottom nozzle insert has properties that are different from traditional bottom nozzle flux thimble interfaces. The properties of the bottom nozzle insert may mitigate wear phenomena observed on the flux thimble. For example, the bottom nozzle insert may be constructed from material that is different from the material of the bottom nozzle. In some aspects, the bottom nozzle insert is constructed from material that has a hardness that is less than the hardness the bottom nozzle material. In other aspects, the bottom nozzle insert is constructed from a material that has a hardness that is less than the hardness of the flux thimble material.

17 Claims, 8 Drawing Sheets

BOTTOM NOZZLE WITH PROTECTIVE INSERT

BACKGROUND

The present disclosure relates generally to nuclear reactors and, more particularly, to bottom nozzle arrangements comprising a protective insert for use in a nuclear fuel assembly of a nuclear reactor.

SUMMARY

In various aspects, a bottom nozzle insert for use in a bottom nozzle of a fuel assembly in a nuclear reactor is disclosed. The bottom nozzle insert comprises: an outer cylindrical portion configured to be disposed within a bottom nozzle opening that extends through a bottom nozzle plate of the bottom nozzle; a first inner cylindrical portion configured for a flux thimble to be inserted therethrough; a second inner cylindrical portion configured for an instrumentation tube of the fuel assembly to be inserted therein; a first rim located proximate to the first inner cylindrical portion; and a second rim located proximate to the second inner cylindrical portion.

In various aspects, a bottom nozzle assembly for use in a fuel assembly in a nuclear reactor is disclosed. The bottom nozzle assembly comprises: a bottom nozzle plate; and a bottom nozzle insert comprising: an outer cylindrical portion configured to be disposed within a bottom nozzle opening that extends through the bottom nozzle plate; a first inner cylindrical portion configured for a flux thimble to be inserted therethrough; a second inner cylindrical portion configured for an instrumentation tube of the fuel assembly to be inserted therein; a first rim located proximate to the first inner cylindrical portion; a second rim located proximate to the second inner cylindrical portion.

FIGURES

The various aspects described herein, together with objects and advantages thereof, may best be understood by reference to the following description, taken in conjunction with the accompanying drawings as follows.

Corresponding reference characters indicate corresponding parts throughout the several views. The exemplifications set out herein illustrate various disclosed aspects, in one form, and such exemplifications are not to be construed as limiting the scope thereof in any manner.

DESCRIPTION

Figure 1:
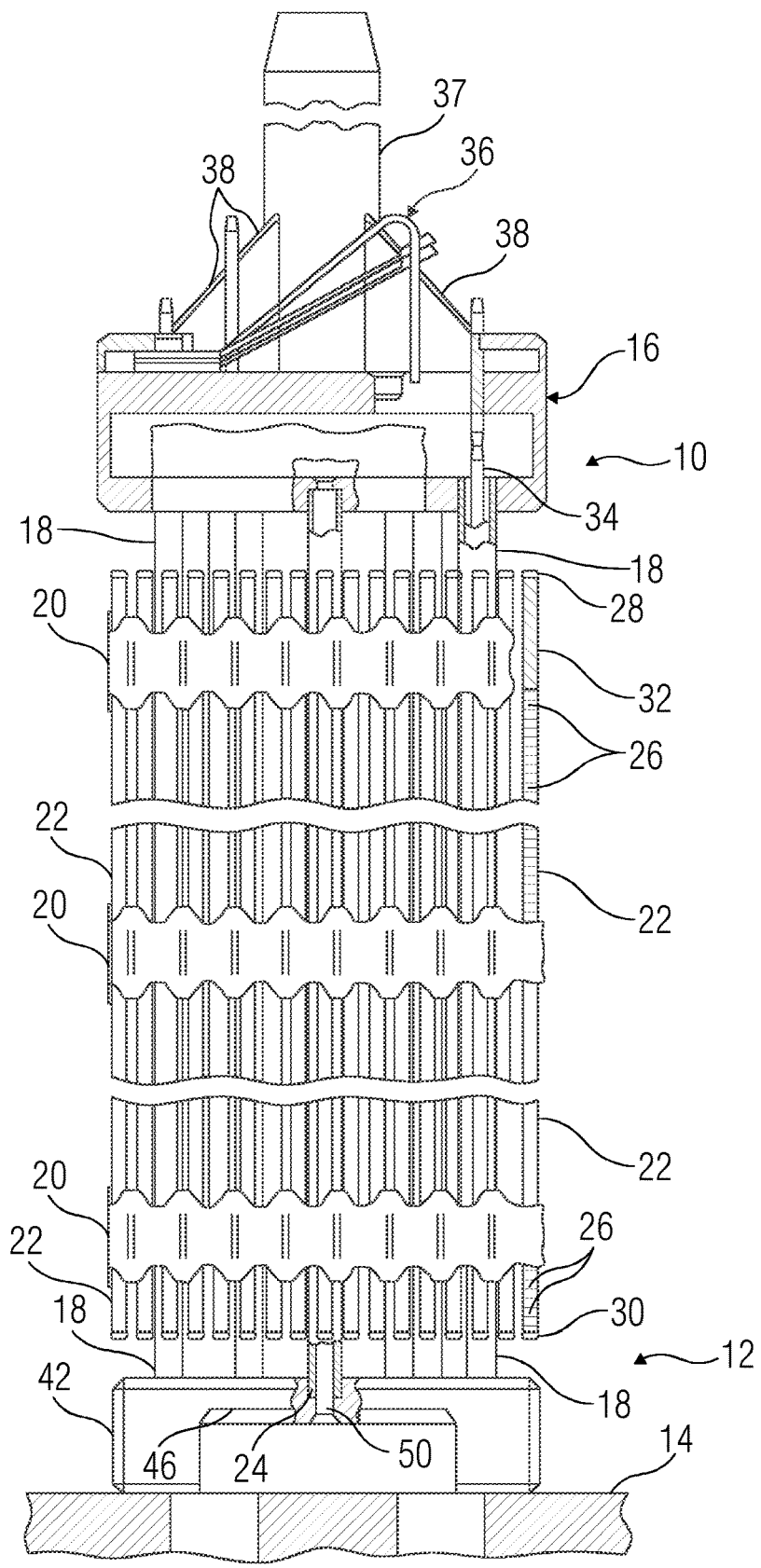
FIG. 1 is a partial cross-section of an elevation view of a fuel assembly according to one aspect of this disclosure.

Numerous specific details are set forth to provide a thorough understanding of the overall structure, function, manufacture, and use of the aspects as described in the disclosure and illustrated in the accompanying drawings. Well-known operations, components, and elements have not been described in detail so as not to obscure the aspects described in the specification. The reader will understand that the aspects described and illustrated herein are non-limiting examples, and thus it can be appreciated that the specific structural and functional details disclosed herein may be representative and illustrative. Variations and changes thereto may be made without departing from the scope of the claims.

In the following description, like reference characters designate like or corresponding parts throughout the several views of the drawings. Also in the following description, it is to be understood that such terms as "forward," "rearward," "left," "right," "above," "below," "upwardly," "downwardly," and the like are words of convenience and are not to be construed as limiting terms.

FIG. 1 is a partial cross-section of an elevation view of a fuel assembly 10 according to one aspect of this disclosure. In some aspects, the fuel assembly 10 may be used in a pressurized water reactor. Fuel assembly 10 may include a bottom nozzle 12 for supporting the fuel assembly 10 on a reactor vessel lower core plate 14 in the core region of a reactor (not shown). In addition to bottom nozzle 12, the structural skeleton of the fuel assembly 10 may also include a top nozzle 16 at its upper end and a number of guide thimble tubes 18 which extend longitudinally between bottom nozzle 12 and top nozzle 16 and at opposite ends are attached thereto.

The fuel assembly 10 may further include a plurality of transverse grids 20 that may be axially spaced along and/or mounted to the guide thimbles 18 and an organized array of elongated fuel rods 22 may be transversely spaced and/or supported by the grids 20. Also, the assembly 10 may have an instrumentation tube 24 located in the center thereof and extending between and mounted to the bottom nozzle 12 and top nozzle 16. With such an arrangement of parts, the fuel assembly 10 may form an integral unit capable of being conveniently handled without damaging the assembly parts.

As mentioned above, the fuel rods 22 of fuel assembly 10 may be held in spaced relationship with one another by grids 20 spaced along the fuel assembly length. Each fuel rod 22 may include nuclear fuel pellets 26 and is closed at its opposite ends by an upper end plug 28 and a lower end plug 30. For example, the pellets 26 may be maintained in a stack by a plenum spring 32 disposed between the upper end plug 28 and the top of the pellet stack. However, in other aspects the pellets 26 may be otherwise configured via alternate mechanisms. In the non-limiting aspect of FIG. 1, the fuel pellets 26 may be composed of a fissile material capable of creating the reactive power of the reactor. However, in other non-limiting aspects of the present disclosure, the pellets 26 may include a variety of suitable materials capable of generating reactive power. Additionally, a liquid moderator/ coolant such as water, or water containing a neutron absorbing material such as boron, may be pumped upwardly through a plurality of flow openings in the lower core plate 14 to the fuel assembly. In still other non-limiting aspects, alternate coolants may be used to a similar effect. The bottom nozzle 12 of the fuel assembly 10 may pass the coolant flow along to the fuel rods 22 of the assembly in order to extract heat generated therein for the production of useful work.

In order to control the fission process, a number of control rods 34 may be reciprocally moved within the fuel assembly 10 of FIG. 1. For example, the rods 34 may be reciprocally moved in the guide thimble tubes 18 located at predetermined positions in fuel assembly 10. Accordingly, a rod cluster control mechanism 36 may be positioned above the top nozzle 16 to support the control rods 34. In fuel assembly 10 of FIG. 1, the control mechanism may include an internally threaded cylindrical member 37 with a plurality of radially extending flukes or arms 38. Each arm 38 may be interconnected to a control rod 34 such that the control mechanism 36 may be operable to move the control rods vertically in the guide thimbles 18 to thereby control the fission process in the fuel assembly 10.

In further reference to FIG. 1, the bottom nozzle 12 may include support means, which may take the form of a plurality of corner legs 42 that may extend from a generally rectangular bottom nozzle plate 46. The corner legs 42 may support the fuel assembly 10 on the reactor vessel lower core plate 14. Additionally, the bottom nozzle 12 may include a flux thimble interface 50. The flux thimble interface 50 may be generally configured as an opening through the bottom nozzle plate 46 that allows a flux thimble to pass through the bottom nozzle 12 into instrumentation tube 24.

Figure 2:
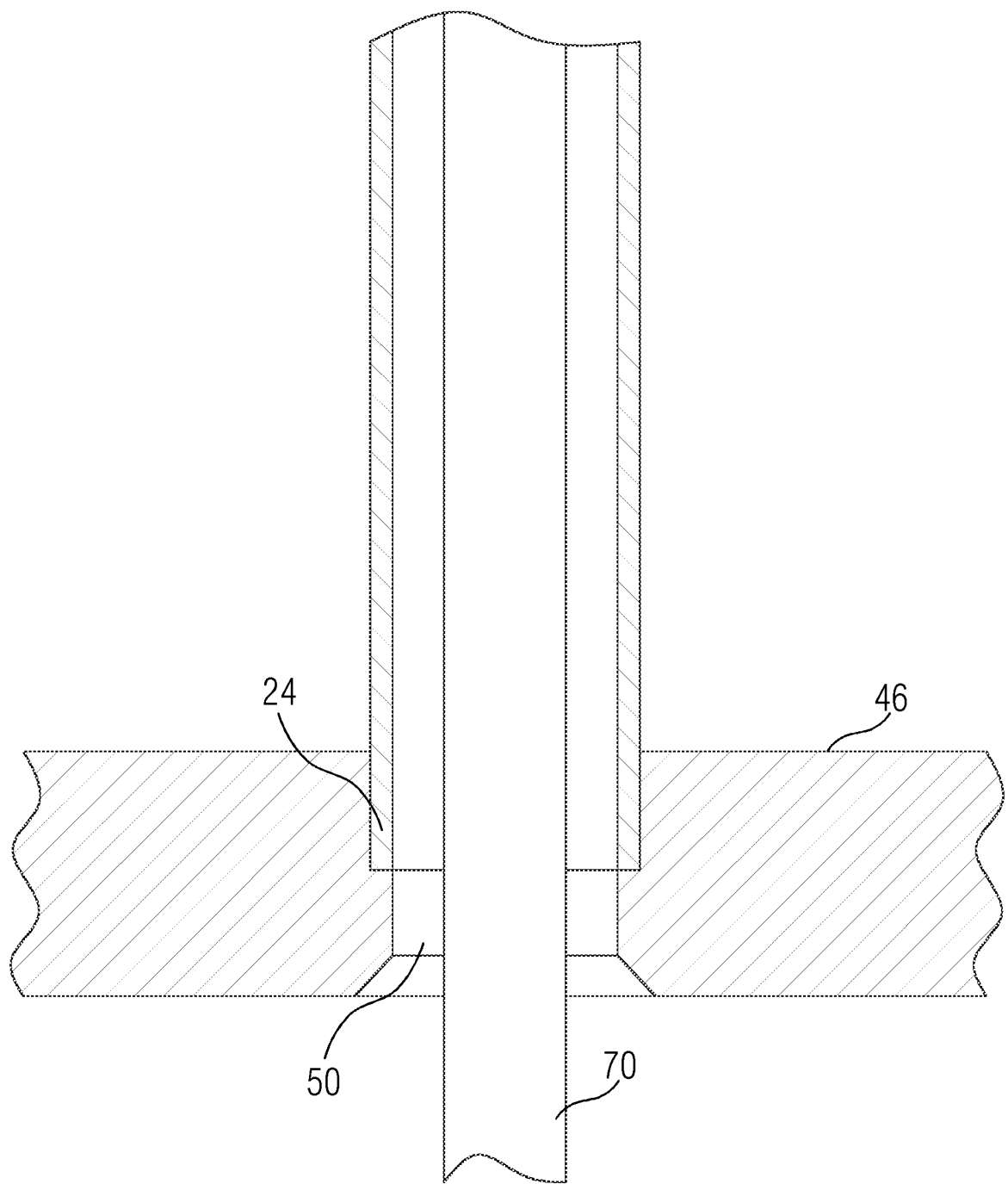
FIG. 2 is a detailed partial cross-sectional view of a flux thimble passing through a bottom nozzle flux thimble interface according to one aspect of this disclosure.

FIG. 2 illustrates a detailed partial cross-sectional view of a flux thimble 70 passing through flux thimble interface 50 according to one aspect of this disclosure. In various aspects, flux thimble 70 is a tube that slidably passes through the flux thimble interface 50 of bottom nozzle plate 46 and into instrumentation tube 24. The flux thimble 70 provides a path for instrumentation to travel into the elongated portion of the fuel assembly 10 through instrumentation tube 24 without being exposed to the liquid moderator/coolant. Accordingly, the terms "flux thimble" and "in-core instrumentation sheath" may be used interchangeably herein. The instrumentation passing within the flux thimble 70 may include a neutron flux detector that is used to determine a level of neutron flux at various locations within fuel assembly 10. Based on the determined flux levels, various operating parameters of the nuclear reactor, such as the position of control rods 34, may be adjusted to control power generation. Thus, it is important to ensure that the flux detector is operating properly within the flux thimble 70.

Figure 3:
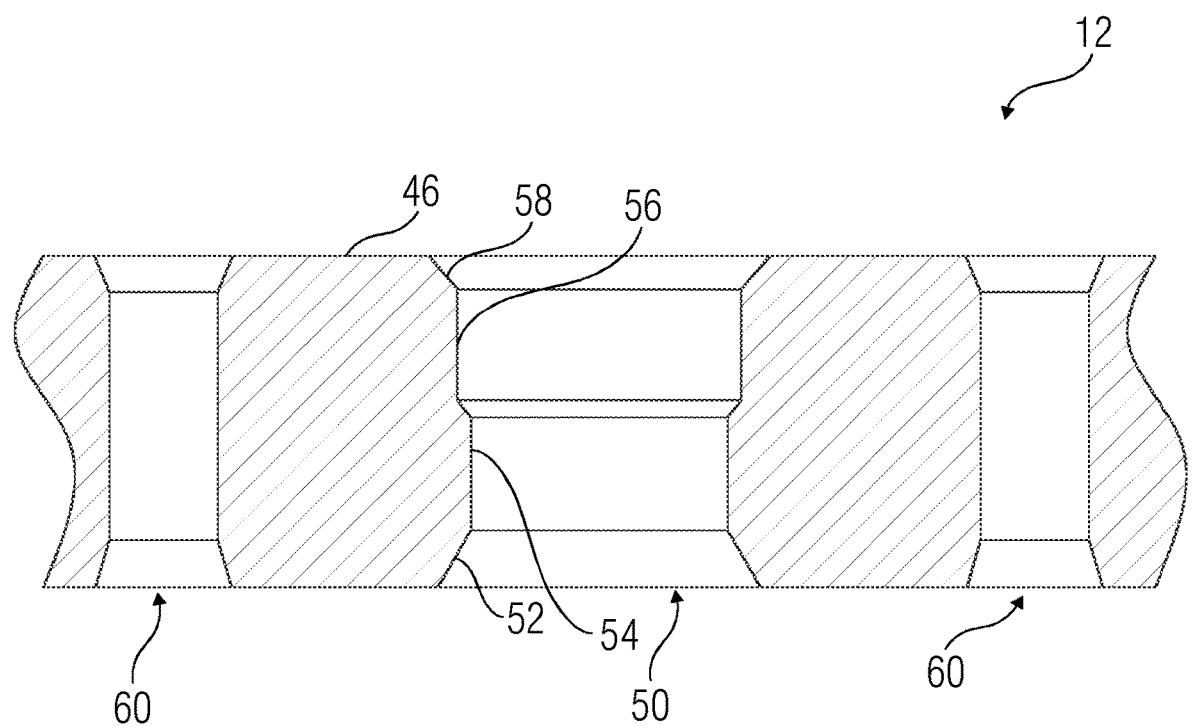
FIG. 3 is a detailed cross-sectional view of a bottom nozzle including a flux thimble interface according to one aspect of this disclosure.

FIG. 3 is a detailed cross-sectional view of bottom nozzle 12 including a flux thimble interface 50 according to one aspect of this disclosure. In some aspects, flux thimble interface 50 may be configured as an opening in bottom nozzle plate 46 to allow the flux thimble 70 (shown in FIG. 2) to pass therethrough. Further, flux thimble interface 50 may include a chamfered inlet 52, a first inner cylindrical portion 54, a second inner cylindrical portion 56, and a chamfered outlet 58. The second inner cylindrical portion 56 may be sized to accommodate the outer diameter of instrumentation tube 24 (shown in FIG. 1, 2). Additionally, the first inner cylindrical portion 54 may be sized such that when the instrumentation tube 24 is seated concentrically within flux thimble interface 50, the diameter of the first inner cylindrical portion 54 of flux thimble interface 50 and the inner diameter of the instrumentation tube 24 are approximately the same. Moreover, inlet chamfer 52 may be formed to allow for easier insertion of the flux thimble 70 into flux thimble interface 50. Similarly, outlet chamfer 58 may be formed to allow for easier insertion of instrumentation tube 24 into flux thimble interface 50.

In further reference to FIG. 3, bottom nozzle plate 46 may include a plurality of flow holes 60. These flow holes 60 allow coolant to pass through bottom nozzle 12 so that the coolant may flow along to the fuel rods 22 and extract heat. In various aspects, bottom nozzle plate 46 may include holes in additional to the flow holes 60. For example, the bottom nozzle plate can include a plurality of holes that interface with a plurality of guide thimbles (e.g., guide thimbles 18 shown in FIG. 1). The flow holes 60, flux thimble interface 50, and various other holes comprised in the bottom nozzle plate 46 may be configured such that structural integrity of bottom nozzle 12 and fuel assembly 10 is not compromised. For example, if a hole 60 is configured in close proximity to flux thimble interface 50 then the structural integrity of bottom nozzle 12 and/or bottom nozzle plate 46 may be weakened.

Figure 4:
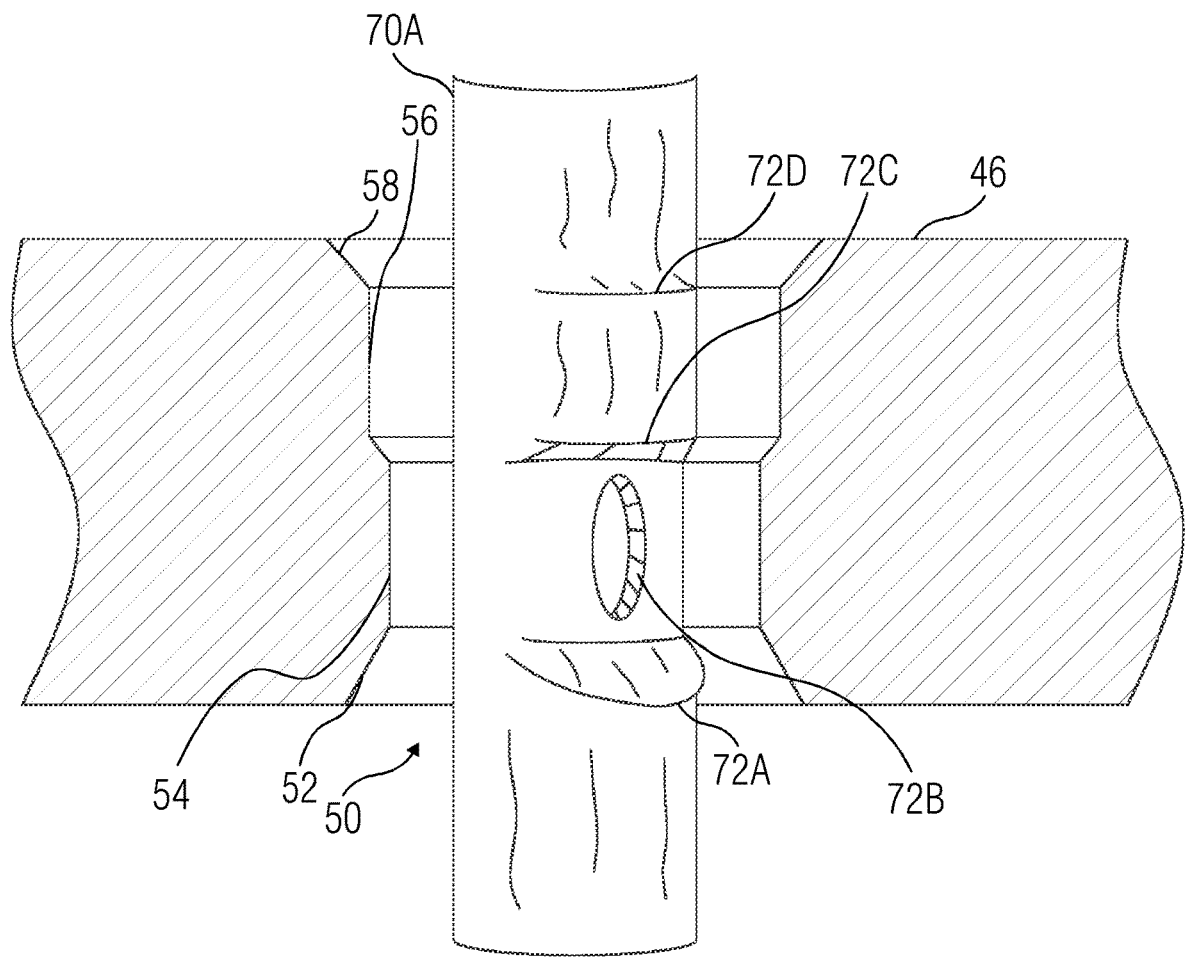
FIG. 4 illustrates a flux thimble with exemplary wear patterns according to one aspect of this disclosure.

FIG. 4 illustrates a flux thimble 70A with exemplary wear patterns 72A-72D according to one aspect of this disclosure. The formation of wear phenomena on the flux thimble may depend on a variety of factors. Without intending to be bound by any one theory, it is believed that the interface between the flux thimble and the bottom nozzle is an important factor contributing to flux thimble wear. For example, as explained above, the flux thimble 70A may be slidably inserted through flux thimble interface 50 and into an instrumentation tube (e.g., instrumentation tube 24) in order to provide a path through which the in-core instrumentation may travel. During relative movement (e.g., axial or lateral) of flux thimble 70A and/or the in-core instrumentation, portions of flux thimble 70A may repeatedly contact and/or slide against flux thimble interface 50. Relative movement between flux thimble 70A and flux thimble interface 50 may lead to wear patterns, such as, for example, wear patterns 72A, 72B, 72C, and 72D forming on flux thimble 70A.

Wear on a flux thimble is generally undesirable because it may result in issues related to the performance of the in-core instrumentation. For example, if wear on the flux thimble is significant, such that the flux thimble tube is penetrated, or compromised, in a particular area, then the in-core instrumentation may be exposed to the liquid moderator/coolant. As discussed above, this coolant may contain a neutron absorbing material such as boron. Thus, as a result of flux thimble wear, the in-core instrumentation may be exposed to neutron absorbing materials that interfere with flux measurements and ultimately impact the efficient operation of the nuclear reactor.

The frequency and severity of wear patterns forming on the flux thimble may be impacted by the type of materials from which the flux thimble and the bottom nozzle are made. For example, flux thimble wear may occur in situations where both the flux thimble and the bottom nozzle are made from materials with the same or approximately the same hardness (e.g., where both the flux thimble and the bottom nozzle are made from 300 series stainless steel, i.e., 304 stainless steel, 316 stainless steel, etc.). Additionally, even more significant flux thimble wear may occur in situations where the bottom nozzle is manufactured from a material with a hardness that is higher than the hardness of the flux thimble material (e.g., where the flux thimble is made from 300 series stainless steel and the bottom nozzle is made from a material that has a higher hardness compared to 300 series stainless steel).

Despite potential flux thimble wear issues, it may nevertheless be desirable to manufacture the bottom nozzle from a material that has a higher hardness compared to the hardness of the material of the flux thimble. Higher hardness materials, such as, for example, Alloy 718 (e.g., a nickel-based alloy commonly referred to under the trade name Inconel 718), can exhibit improved strength over 300 series stainless steel. Manufacturing bottom nozzles from higher strength materials may mitigate the various concerns related to bottom nozzle structural integrity mentioned above. For example, higher strength materials may enable the design and implementation of bottom nozzles with flow holes that are larger and/or configured in closer proximity to the flux thimble interface. These materials may also enable the implementation of a larger opening at the flux thimble interface. Additionally, higher strength materials may be used to create 3D-printed bottom nozzles using additive manufacturing (AM) techniques to take advantage of the complex geometries that may be produced with this technology, such as the bottom nozzles described in U.S. Patent Application Publication No. 2020/0373025, titled DEBRIS FILTERING ARRANGEMENT FOR NUCLEAR FUEL ASSEMBLY BOTTOM NOZZLE AND BOTTOM NOZZLE INCLUDING SAME, filed May 22, 2019, which is incorporated by reference herein in its entirety. Thus, materials exhibiting improved strength compared to 300 series stainless steel may be used to construct the bottom nozzle. However, these higher strength materials may also have a higher hardness than 300 series stainless steel which may lead to issues related to flux thimble wear.

Attempts have been made to mitigate flux thimble wear by applying a protective surface treatment (i.e. chrome plating) to the flux thimble. However, this approach can be costly and is not implemented by many nuclear facilities. Thus, facilities without surface treated flux thimbles will potentially observe more flux thimble wear if bottom nozzles constructed of harder materials, such as Alloy 718, are used. Accordingly, there is a need for a bottom nozzle flux thimble interface that may be inserted into the bottom nozzle and that may have features and properties that mitigate the formation of wear phenomena on the flux thimble.

Figure 5:
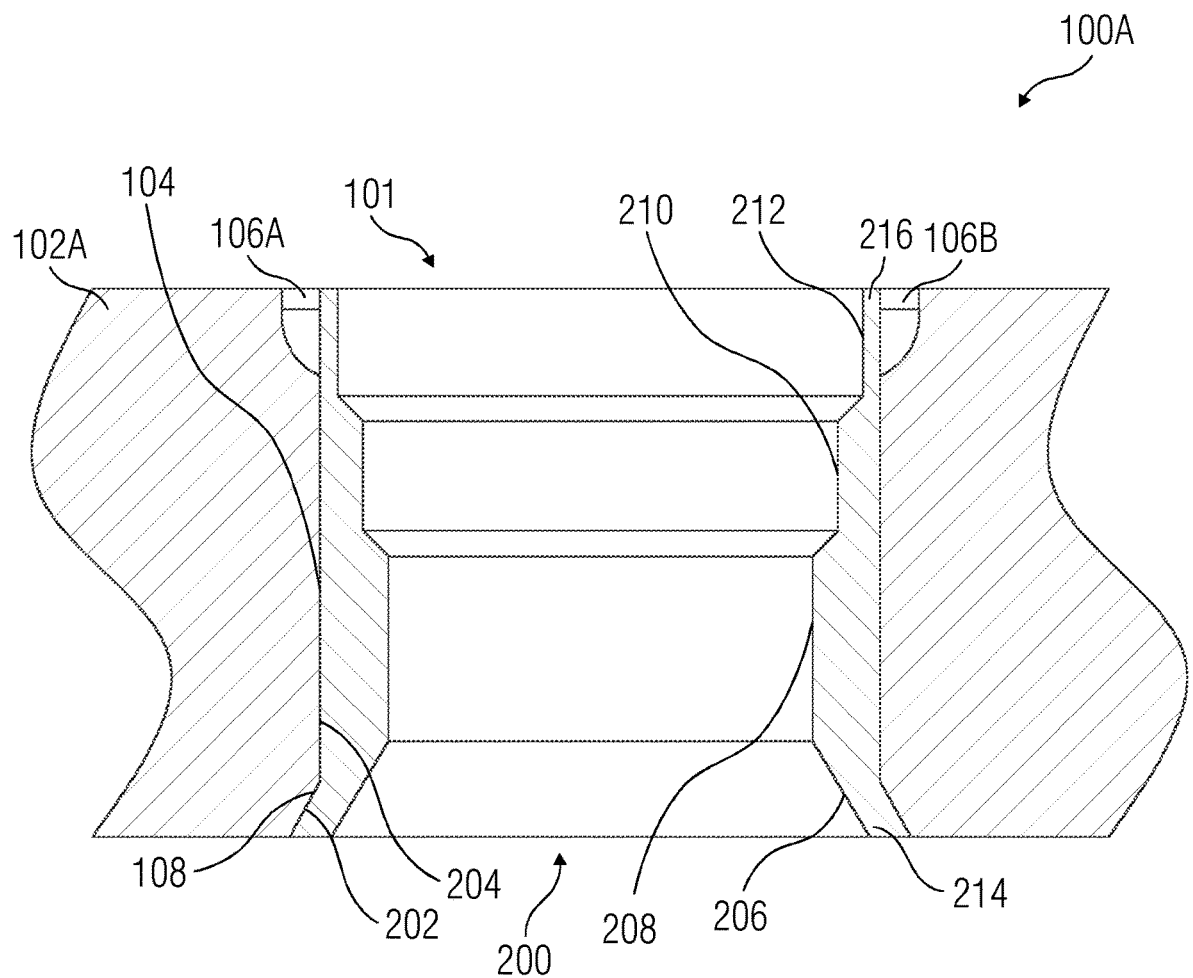
FIG. 5 is a detailed cross-sectional view of a bottom nozzle assembly including a bottom nozzle flux thimble interface insert to according to one aspect of this disclosure.

FIG. 5 is a detailed cross-sectional view of a bottom nozzle assembly 100A including a bottom nozzle flux thimble interface insert 200 (sometimes referred herein as "bottom nozzle insert 200") according to one aspect of this disclosure. Bottom nozzle insert 200 is configured to be disposed within a bottom nozzle opening 101 that extends through bottom nozzle plate 102A. Bottom nozzle insert 200 may comprise an outer cylindrical portion 204 that is configured such that bottom nozzle insert 200 may be slidably inserted into cylindrical portion 104 of bottom nozzle opening 101. Bottom nozzle insert 200 may further comprise a first inner cylindrical portion 208 that is configured for a flux thimble (e.g. flux thimble 70) to be inserted therethrough and a second inner cylindrical portion 210 configured for an instrumentation tube (e.g., instrumentation tube 24) to be inserted therein. Additionally, bottom nozzle insert 200 may comprise an inner conical portion 206 configured to allow for easier insertion of the flux thimble (e.g. flux thimble 70) into the bottom nozzle insert 200. In various aspects, the first inner cylindrical portion 208, the second inner cylindrical portion 210, and the inner conical portion 206 of bottom nozzle interface 200 may be sized similarly to the first inner cylindrical portion 54, the second inner cylindrical portion 56, and the chamfered inlet 52 of flux thimble interface 50, respectively. Additionally, bottom nozzle insert 200 may comprise a first rim 214 that is located proximate to the first inner cylindrical portion 208 and a second rim 216 that is located proximate to the second inner cylindrical portion 210. In various aspects, the outer cylindrical portion 204, the first inner cylindrical portion 208, and the second inner cylindrical portion 210 of bottom nozzle insert 200 are concentric. Accordingly, bottom nozzle insert 200 may be described as having a central longitudinal axis that is common to the outer cylindrical portion 204, the first inner cylindrical portion 208, and the second inner cylindrical portion 210.

Still referring to FIG. 5, bottom nozzle insert 200 may further comprise an outer conical portion 202 that extends from outer cylindrical portion 204 and terminates at the first rim 214. Moreover, as bottom nozzle insert 200 is inserted into bottom nozzle opening 101, the outer conical portion 202 of bottom nozzle insert 200 may be configured to seat against a conical portion 108 of bottom nozzle opening 101. When seated, outer conical portion 202 and conical portion 108 ensure that the central longitudinal axis of bottom nozzle insert 200 and the longitudinal axis of cylindrical portion 104 of bottom nozzle opening 101 are coaxial. This seating also ensures that the central longitudinal axis of bottom nozzle insert 200 is perpendicular to bottom nozzle plate 102A. Thus, the various features of bottom nozzle assembly 100A may be configured to ensure that bottom nozzle insert 200 is correctly positioned within bottom nozzle plate 102A.

Still referring to FIG. 5, bottom nozzle insert 200 may further comprise a third inner cylindrical portion 212 that terminates at the second rim 216. The third inner cylindrical portion 212 may have a diameter that is larger than the diameter of the second inner cylindrical portion 210. Thus, the thickness of bottom nozzle insert 200 between the outer cylindrical portion 204 and the third inner cylindrical portion 212 (i.e. the thickness of the second rim 216) may be less than the thickness between the outer cylindrical portion 204 and the second inner cylindrical portion 210. Accordingly, the third inner cylindrical portion 212 and the second rim 216 may be configured to allow a portion of the second rim 216 to be crimped against crimp features 106A and 106B (e.g., cup-shaped notches) of bottom nozzle opening 101. Although FIG. 5 illustrates crimp features 106A and 106B as cup-shaped notches in bottom nozzle opening 101, notches with various other shapes may be configured into bottom nozzle opening 101 such that portions of the second rim 216 may be crimped therein.

Figure 6:
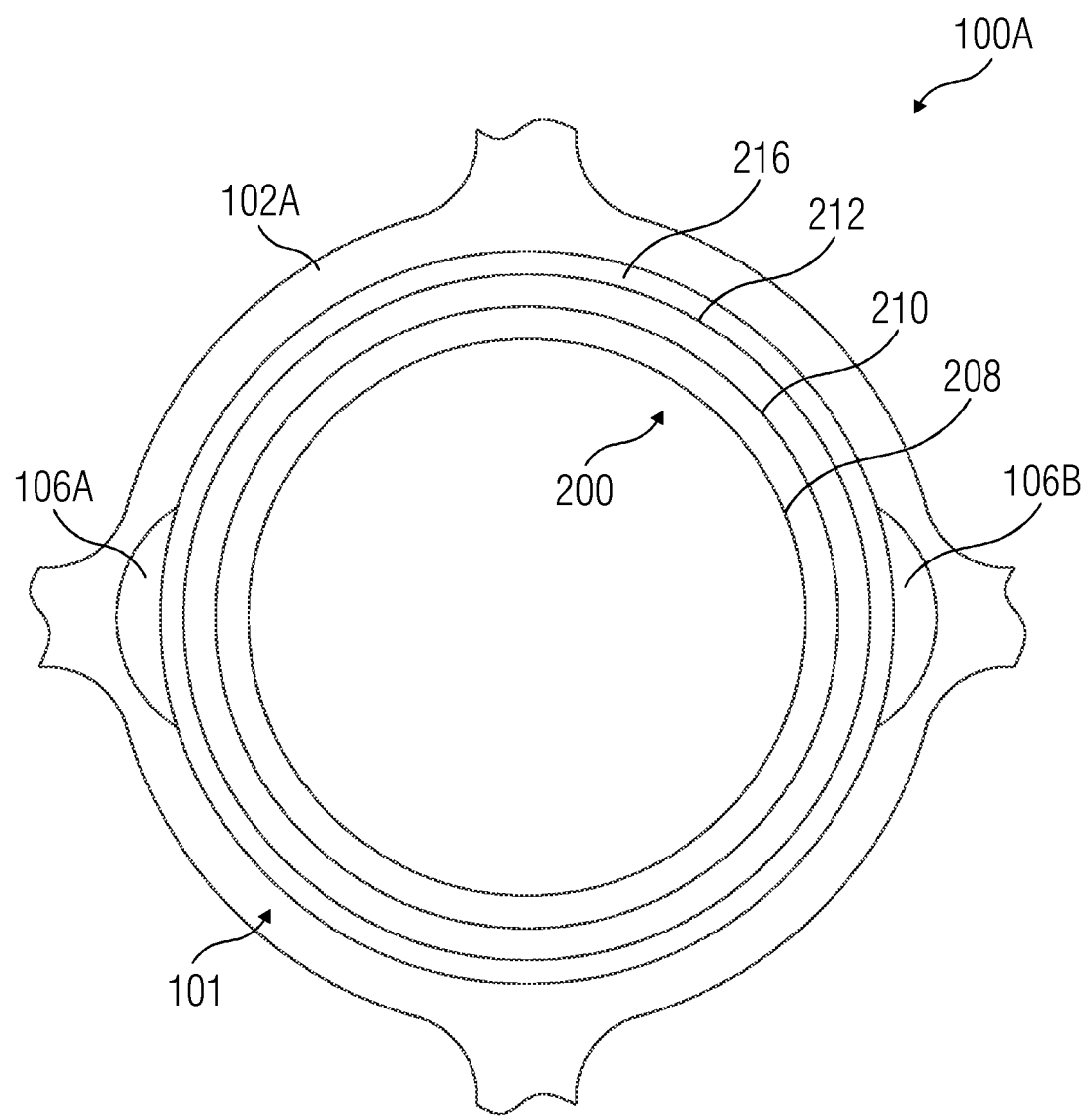
FIG. 6 is a detailed plan view of a bottom nozzle assembly including a bottom nozzle flux thimble interface insert and a bottom nozzle opening with two (2) crimp features according to one aspect of this disclosure.

FIG. 6 is a detailed plan view of a bottom nozzle assembly 100A including a bottom nozzle insert 200 and a bottom nozzle opening 101 with two crimp features 106A and 106B according to one aspect of this disclosure. When bottom nozzle insert 200 is inserted into bottom nozzle opening 101, portions of the second rim 216 may be crimped into and/or against crimp features 106A and 106B. This crimping may serve several purposes. For example, crimping the second rim 216 into one or more of the crimp features 106A/B may serve to lock bottom nozzle insert 200 in place and/or prevent bottom nozzle insert 200 from sliding longitudinally out of bottom nozzle opening 101 in the direction of conical features 202 and 108. Additionally, conical features 202 and 108 may serve to lock bottom nozzle insert 200 in place and/or prevent bottom nozzle insert 200 from sliding longitudinally out of bottom nozzle opening 101 in the direction of the crimp features 106A/B. Crimping the rim 216 into one or more of the crimp features 106A/B may also prevent bottom nozzle insert 200 from rotating about its longitudinal axis and/or otherwise moving within bottom nozzle opening 101. Thus, the various features of bottom nozzle assembly 100A may be configured to ensure that bottom nozzle insert 200 remains properly positioned after it is disposed within bottom nozzle plate 102A.

Figure 7:
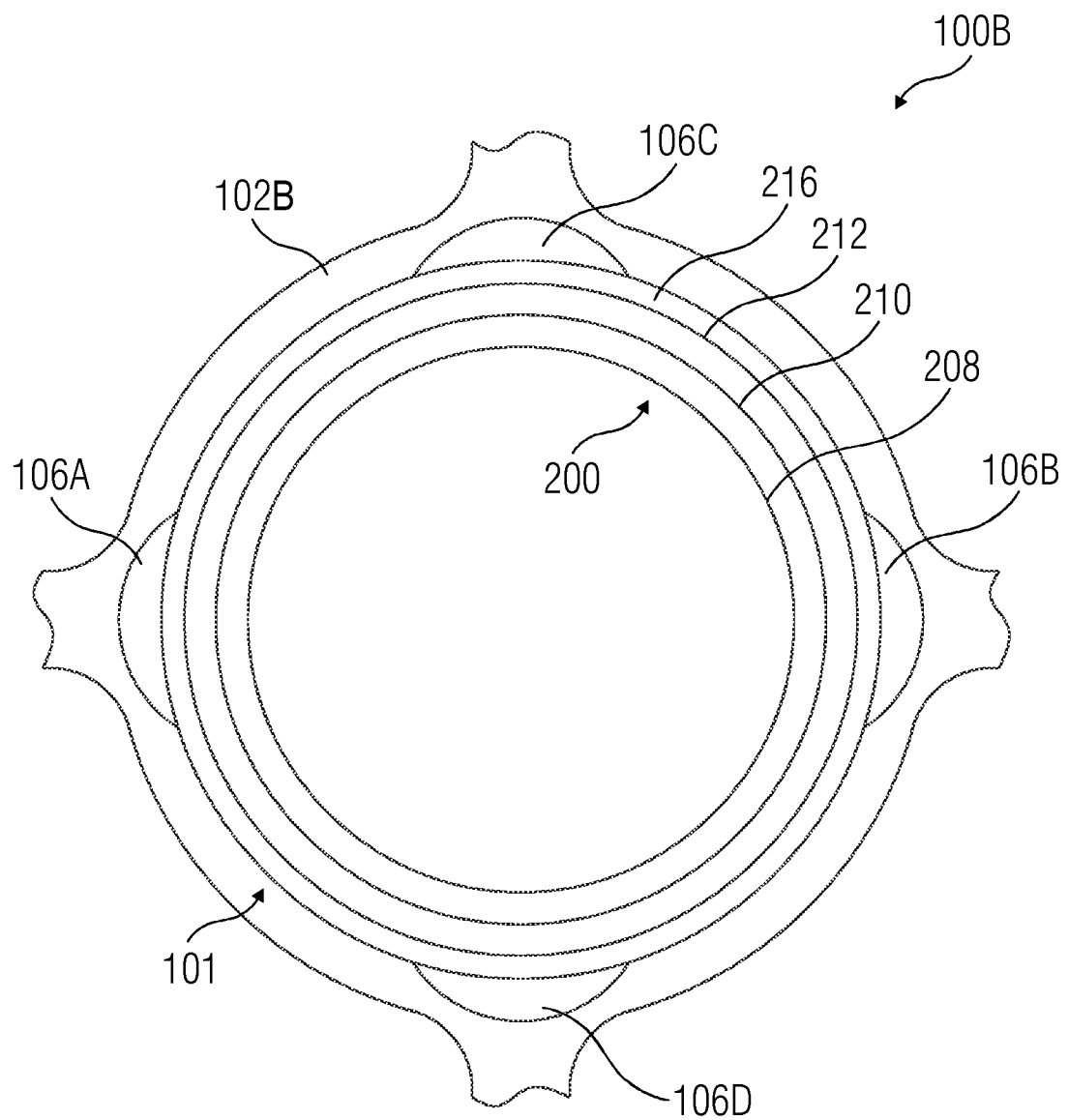
FIG. 7 is a detailed plan view of a bottom nozzle assembly including a bottom nozzle flux thimble interface insert and a bottom nozzle opening with four (4) crimp features according to one aspect of this disclosure.

FIG. 7 is a detailed plan view of a bottom nozzle assembly 100B including a bottom nozzle insert 200 and a bottom nozzle 102B according to one aspect of this disclosure. Bottom nozzle 102B may include a bottom nozzle opening 101 comprising four crimp features 106A, 106B, 106C, and 106D. As explained above, crimp features may ensure that bottom nozzle insert 200 does not slide, rotate, or otherwise move after it is positioned within bottom nozzle opening 101. Accordingly, bottom nozzle opening 101 may be configured with a plurality of crimp features (e.g., 106C, 106D, etc.) as necessary to optimize the retention of bottom nozzle insert 200 therein.

Figure 8:
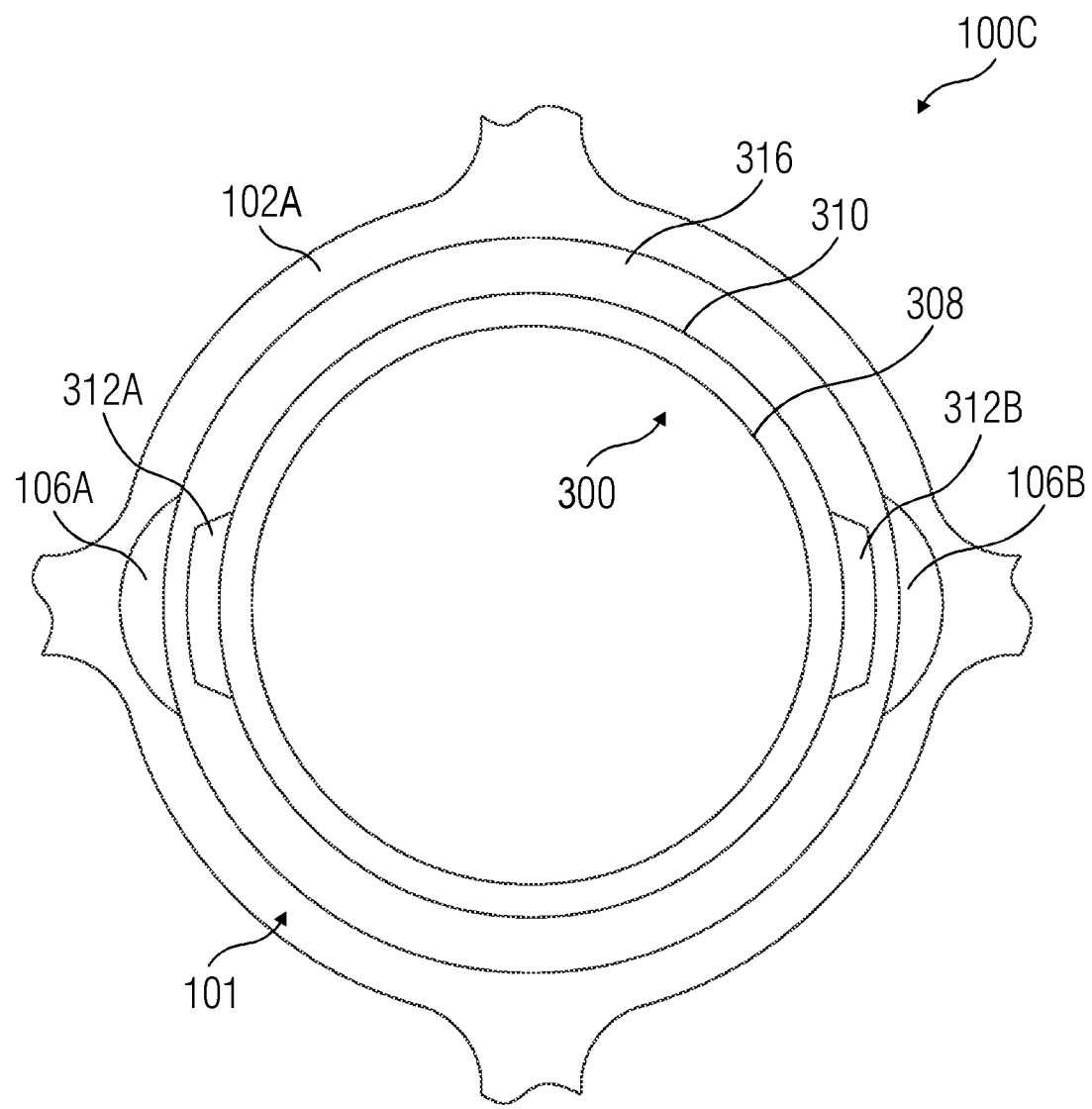
FIG. 8 is a detailed plan view of a bottom nozzle assembly including a bottom nozzle flux thimble interface insert and a bottom nozzle opening with two (2) crimp features according to one aspect of this disclosure.

FIG. 8 is a detailed plan view of a bottom nozzle assembly 100C including a bottom nozzle insert 300 and a bottom nozzle opening 101 with two crimp features 106A and 106B according to one aspect of this disclosure. Similar to bottom nozzle insert 200, bottom nozzle insert 300 may comprise a first inner cylindrical portion 308 that is configured for an flux thimble (e.g. flux thimble 70) to be inserted therethrough and a second inner cylindrical portion 310 configured for an instrumentation tube (e.g., instrumentation tube 24) to be inserted therein. However, rather than having a third inner cylindrical portion with a diameter that is larger than the diameter of second inner cylindrical portion 310 (e.g., similar to third inner cylindrical portion 212), the second inner cylindrical portion 310 of bottom nozzle insert 300 may extend to terminate at rim 316. However, to achieve a desired rim thickness for crimping, the second inner cylindrical portion 310 may comprise notch features such as, for example, notch features 312A and 312B. These notch features may be configured to allow portions of rim 316 to be crimped against one or more crimp features (such crimp features 106A and/or 106B) of bottom nozzle opening 101. Thus, the second inner cylindrical portion 310 of bottom nozzle insert 300 may have a longitudinal length that is longer than the length of the second inner cylindrical portion 210 of bottom nozzle insert 200. This longer length may provide for additional contact surface area between the instrumentation tube and the bottom nozzle insert compared to flux thimble interface 50 and/or bottom nozzle insert 200. As a result, the positioning and stability of the instrumentation within the bottom nozzle insert may be improved.

The various bottom nozzles, bottom nozzle plates, bottom nozzle inserts, flux thimbles, instrumentation tubes, and other components disclosed herein may be constructed from a variety of materials and/or combinations of materials. In some aspects, the bottom nozzle insert may be constructed from a material that is different from the material used to construct the bottom nozzle and/or bottom nozzle plate. Additionally, it may be desirable to construct the bottom nozzle insert from a material that has a hardness that is less than the hardness of the material used to construct the bottom nozzle and/or bottom nozzle plate. Thus, in some cases, the bottom nozzle insert may be constructed from a material that has approximately the same hardness as the material used to construct the flux thimble tube and/or the instrumentation tube. And in other cases, the bottom nozzle insert may be constructed from a material that has a hardness that is less than the hardness of the material used to construct the flux thimble tube. For example, as mentioned above, it may be desirable to manufacture the bottom nozzle and/or the bottom nozzle plate from materials such as Alloy 718 (e.g., a nickel-based alloy commonly referred to under the trade name Inconel 718) because it offers improved strength over 300 series stainless steel. Additionally, materials such as Alloy 718 may be used to create 3D-printed bottom nozzles that are formed using additive manufacturing (AM) techniques to take advantage of the complex geometries that may be produced with this technology. However, Alloy 718 has a higher hardness compared to 300 series stainless steel. Thus, to mitigate potential wear occurring on a flux thimble tube constructed from 300 series steel caused by contact with a bottom nozzle and/or bottom nozzle plate constructed from Alloy 718, a bottom nozzle insert constructed from 300 series steel may be used. Or, alternately, a bottom nozzle constructed from a material that is softer than 300 series stainless steel (e.g., zirconium) may be used to mitigate flux thimble wear to a flux thimble tube constructed 300. Accordingly, by using a bottom nozzle insert that has characteristics (e.g., material properties, geometry, etc.) that are different from a flux thimble interface hole that is drilled directly into the bottom plate of a bottom nozzle, wear to the flux thimble may be mitigated.

As used herein, hardness generally refers to the ability of a material to withstand surface wear (i.e. abrasion, scratching, and/or localized surface indentation). Various hardness scales may be used to quantify relative hardness, such as, for example, the Brinell hardness, Vickers hardness, and Rockwell hardness scales.

EXAMPLES

Various aspects of the bottom nozzle insert and bottom nozzle assembly described herein are set out in the following examples.

Example 1: A bottom nozzle insert for use in a bottom nozzle of a fuel assembly in a nuclear reactor, the bottom nozzle insert comprising: an outer cylindrical portion configured to be disposed within a bottom nozzle opening that extends through a bottom nozzle plate of the bottom nozzle; a first inner cylindrical portion configured for a flux thimble to be inserted therethrough; a second inner cylindrical portion configured for an instrumentation tube of the fuel assembly to be inserted therein; a first rim located proximate to the first inner cylindrical portion; and a second rim located proximate to the second inner cylindrical portion.

Example 2: The bottom nozzle insert of Example 1 further comprising: an outer conical portion extending from the outer cylindrical portion and terminating at the first rim, the outer conical portion configured to seat against a conical portion of the bottom nozzle opening; wherein seating the outer conical portion of the bottom nozzle insert against the conical portion of the bottom nozzle opening ensures that a longitudinal axis of the bottom nozzle is coaxial with a longitudinal axis of the bottom nozzle opening and perpendicular to the bottom nozzle plate.

Example 3: The bottom nozzle insert of any one or more of Examples 1-2 further comprising: a third inner cylindrical portion terminating at the second rim; wherein the third inner cylindrical portion is configured to allow a portion of the second rim to be crimped against a crimp feature of the bottom nozzle opening.

Example 4: The bottom nozzle insert of any one or more of Examples 1-3 wherein the bottom nozzle opening comprises two crimp features.

Example 5: The bottom nozzle insert of any one or more of Examples 1-4 wherein the bottom nozzle opening comprises four crimp features.

Example 6: The bottom nozzle insert of any one or more of Examples 1-2 and 4-7 wherein the second inner cylindrical portion terminates at the second rim, and wherein the second inner cylindrical portion comprises a notch feature configured to allow a portion of the second rim to be crimped against a crimp feature of the bottom nozzle opening.

Example 7: The bottom nozzle insert of any one or more of Examples 1-6 wherein the bottom nozzle insert comprises a first material, wherein the bottom nozzle plate comprises a second material, and wherein the first material and the second material are different.

Example 8: The bottom nozzle insert of any one or more of Examples 1-7 wherein the first material has a hardness that is less than a hardness of the second material.

Example 9: The bottom nozzle insert of any one or more of Examples 1-8 wherein the flux thimble comprises a third material, and wherein the first material and the third material have approximately the same hardness.

Example 10: The bottom nozzle insert of any one or more of Examples 1-9 wherein the first material and the third material comprise 300 series stainless steel.

Example 11: The bottom nozzle insert of any one or more of Examples 1-8 wherein the flux thimble comprises a third material, and wherein the first material has a hardness that is less than a hardness of the third material.

Example 12: The bottom nozzle insert of any one or more of Examples 1-11 wherein the first material comprises zirconium.

Example 13: A bottom nozzle assembly for use in a fuel assembly in a nuclear reactor, the bottom nozzle assembly comprising: a bottom nozzle plate; and a bottom nozzle insert comprising: an outer cylindrical portion configured to be disposed within a bottom nozzle opening that extends through the bottom nozzle plate; a first inner cylindrical portion configured for a flux thimble to be inserted therethrough; a second inner cylindrical portion configured for an instrumentation tube of the fuel assembly to be inserted therein; a first rim located proximate to the first inner cylindrical portion; a second rim located proximate to the second inner cylindrical portion.

Example 14: The bottom nozzle assembly of Example 13 wherein the bottom nozzle insert further comprises: an outer conical portion extending from the outer cylindrical portion and terminating at the first rim, the outer conical portion configured to seat against a conical portion of the bottom nozzle opening; wherein seating the outer conical portion of the bottom nozzle insert against the conical portion of the bottom nozzle opening ensures that a longitudinal axis of the bottom nozzle is coaxial with a longitudinal axis of the bottom nozzle opening and perpendicular to the bottom nozzle plate.

Example 15: The bottom nozzle assembly of any one or more of Examples 13-14 wherein the bottom nozzle insert further comprises: a third inner cylindrical portion terminating at the second rim; wherein the third inner cylindrical portion is configured to allow a portion of the second rim to be crimped against a crimp feature of the bottom nozzle opening.

Example 16: The bottom nozzle assembly of any one or more of Examples 13-15 wherein the bottom nozzle opening comprises two crimp features.

Example 17: The bottom nozzle assembly of any one or more of Examples 13-16 wherein the bottom nozzle opening comprises four crimp features.

Example 18: The bottom nozzle assembly of any one or more of Examples 13-14 and 16-17 wherein the second inner cylindrical portion terminates at the second rim, wherein the second inner cylindrical portion comprises a notch feature configured to allow a portion of the second rim to be crimped against a crimp feature of the bottom nozzle opening.

Example 19: The bottom nozzle assembly of any one or more of Examples 13-18 wherein the bottom nozzle insert comprises a first material, wherein the bottom nozzle plate comprises a second material, and wherein the first material and the second material are different.

Example 20: The bottom nozzle assembly of any one or more of Examples 13-19 wherein the first material has a hardness that is less than a hardness of the second material.

Example 21: The bottom nozzle assembly of any one or more of Examples 13-20 wherein the second material comprises nickel alloy 718.

Example 22: The bottom nozzle assembly of any one or more of Examples 13-21 wherein the bottom nozzle plate is formed using additive manufacturing.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B." It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

The term "substantially", "about", or "approximately" as used in the present disclosure, unless otherwise specified, means an acceptable error for a particular value as determined by one of ordinary skill in the art, which depends in part on how the value is measured or determined. In certain embodiments, the term "substantially", "about", or "approximately" means within 1, 2, 3, or 4 standard deviations. In certain embodiments, the term "substantially", "about", or "approximately" means within 50%, 20%, 15%, 10%, 9%, 8%, 7%, 6%, 5%, 4%, 3%, 2%, 1%, 0.5%, or 0.05% of a given value or range.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A bottom nozzle insert for use in a bottom nozzle of a fuel assembly in a nuclear reactor, the bottom nozzle insert configured to be disposed within a bottom nozzle opening that extends through a bottom nozzle plate of the bottom nozzle, the bottom nozzle opening comprising a cylindrical surface, the bottom nozzle insert comprising:
   an outer cylindrical surface configured to seat against the cylindrical surface of the bottom nozzle opening;
   a first inner cylindrical surface defining a first diameter, wherein the first diameter is sized for a flux thimble to be inserted through a first portion of the bottom nozzle insert defined by the first inner cylindrical surface;
   a second inner cylindrical surface defining a second diameter, wherein the second diameter is sized for an instrumentation tube of the fuel assembly to be inserted into a second portion of the bottom nozzle insert defined by the second inner cylindrical surface and seat against the second inner cylindrical surface, and wherein the first diameter is smaller than the second diameter and sized such that the instrumentation tube is not insertable into the first portion of the bottom nozzle insert defined by the first inner cylindrical surface;
   a first rim comprising a first end surface of the bottom nozzle insert; and
   a second rim comprising a second end surface of the bottom nozzle insert.

2. The bottom nozzle insert of claim 1, wherein the bottom nozzle opening further comprises a conical surface extending radially outward from the cylindrical surface, the bottom nozzle insert further comprising:
   an outer conical surface extending radially outward from the outer cylindrical surface and terminating at the first end surface, the outer conical surface configured to seat against the conical surface of the bottom nozzle opening;
   wherein seating the outer conical surface of the bottom nozzle insert against the conical surface of the bottom nozzle opening ensures that a longitudinal axis of the bottom nozzle is coaxial with a longitudinal axis of the bottom nozzle opening and perpendicular to the bottom nozzle plate.

3. The bottom nozzle insert of claim 1, wherein the bottom nozzle opening further comprises a crimp feature extending radially outward from the cylindrical surface, the bottom nozzle insert further comprising:
   a third inner cylindrical surface terminating at the second end surface;
   wherein the outer cylindrical surface and the second inner cylindrical surface define a first thickness;
   wherein the outer cylindrical surface and the third inner cylindrical surface define a second thickness;
   wherein the first thickness is greater than the second thickness; and
   wherein the second thickness is sized to allow a portion of the second rim to be crimped against the crimp feature of the bottom nozzle opening.

4. The bottom nozzle insert of claim 1, wherein the second inner cylindrical surface terminates at the second end surface, and wherein the bottom nozzle insert further comprises a notch feature defined in the second inner cylindrical surface sized to allow a portion of the second rim to be crimped against a crimp feature of the bottom nozzle opening.

5. The bottom nozzle insert of claim 1, further comprising a material that has a hardness less than a hardness of nickel alloy 718.

6. The bottom nozzle insert of claim 5, wherein the material comprises 300 series stainless steel.

7. The bottom nozzle insert of claim 5, wherein the material comprises zirconium.

8. A bottom nozzle assembly for use in a fuel assembly in a nuclear reactor, the bottom nozzle assembly comprising:
   a bottom nozzle plate comprising a bottom nozzle opening that extends through the bottom nozzle plate, wherein the bottom nozzle opening defines a cylindrical surface; and
   a bottom nozzle insert disposed within the bottom nozzle opening, the bottom nozzle insert comprising:
      an outer cylindrical surface configured to seat against the cylindrical surface of the bottom nozzle opening;
      a first inner cylindrical surface defining a first diameter, wherein the first diameter is sized for a flux thimble to be inserted through a first portion of the bottom nozzle insert defined by the first inner cylindrical surface;
      a second inner cylindrical surface defining a second diameter, wherein the second diameter is sized for an instrumentation tube of the fuel assembly to be inserted into a second portion of the bottom nozzle insert defined by the second inner cylindrical surface and seat against the second inner cylindrical surface, and wherein the first diameter is smaller than the second diameter and sized such that the instrumentation tube is not insertable into the first portion of the bottom nozzle insert defined by the first inner cylindrical surface;
      a first rim comprising a first end surface of the bottom nozzle; and
      a second rim comprising a second end surface of the bottom nozzle.

9. The bottom nozzle assembly of claim 8, wherein the bottom nozzle opening further defines a conical surface extending radially outward from the cylindrical surface, and wherein the bottom nozzle insert further comprises:
   an outer conical surface extending radially outward from the outer cylindrical surface and terminating at the first end surface, the outer conical surface configured to seat against the conical surface of the bottom nozzle opening;
   wherein seating the outer conical surface of the bottom nozzle insert against the conical surface of the bottom nozzle opening ensures that a longitudinal axis of the bottom nozzle is coaxial with a longitudinal axis of the bottom nozzle opening and perpendicular to the bottom nozzle plate.

10. The bottom nozzle assembly of claim 8, wherein the bottom nozzle opening comprises a crimp feature extending radially outward from the cylindrical surface, and wherein the bottom nozzle insert further comprises:
    a third inner cylindrical surface terminating at the second end surface;
    wherein the outer cylindrical surface and the second inner cylindrical surface define a first thickness;
    wherein the outer cylindrical surface and the third inner cylindrical surface define a second thickness;
    wherein the first thickness is greater than the second thickness; and
    wherein the second thickness is sized to allow a portion of the second rim to be crimped against the crimp feature of the bottom nozzle opening.

11. The bottom nozzle assembly of claim 10, wherein the bottom nozzle opening comprises two crimp features.

12. The bottom nozzle assembly of claim 10, wherein the bottom nozzle opening comprises four crimp features.

13. The bottom nozzle assembly of claim 8, wherein the second inner cylindrical surface terminates at the second end surface, and wherein the bottom nozzle insert further comprises a notch feature defined in the second inner cylindrical surface sized to allow a portion of the second rim to be crimped against a crimp feature of the bottom nozzle opening.

14. The bottom nozzle assembly of claim 8, wherein the bottom nozzle insert comprises a first material, wherein the bottom nozzle plate comprises a second material, and wherein the first material and the second material are different.

15. The bottom nozzle assembly of claim 14, wherein the first material has a hardness that is less than a hardness of the second material.

16. The bottom nozzle assembly of claim 15, wherein the second material comprises nickel alloy 718.

17. The bottom nozzle assembly of claim 14, wherein the bottom nozzle plate is formed using additive manufacturing.

\* \* \* \* \*